United States Patent
Huang et al.

(10) Patent No.: US 12,479,767 B2
(45) Date of Patent: Nov. 25, 2025

(54) GYPSUM CEMENT WITH REDUCED PERMEABILITY

(71) Applicant: Owens Corning Intellectual Capital, LLC, Toledo, OH (US)

(72) Inventors: Helen Huang, New Albany, OH (US); Steven Badger, Pittsburgh, PA (US)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 402 days.

(21) Appl. No.: 17/488,402

(22) Filed: Sep. 29, 2021

(65) Prior Publication Data

US 2023/0096189 A1    Mar. 30, 2023

(51) Int. Cl.
| | |
|---|---|
| *C04B 28/14* | (2006.01) |
| *C03C 11/00* | (2006.01) |
| *C04B 24/24* | (2006.01) |
| *C04B 24/42* | (2006.01) |
| *E04B 1/68* | (2006.01) |
| *F16L 59/02* | (2006.01) |
| *F16L 59/18* | (2006.01) |
| *C04B 103/65* | (2006.01) |
| *C04B 111/00* | (2006.01) |
| *C04B 111/27* | (2006.01) |
| *E04B 1/62* | (2006.01) |

(52) U.S. Cl.
CPC ............ *C04B 28/14* (2013.01); *C03C 11/007* (2013.01); *C04B 24/24* (2013.01); *C04B 24/42* (2013.01); *E04B 1/6801* (2013.01); *F16L 59/028* (2013.01); *F16L 59/18* (2013.01); *C04B 2103/65* (2013.01); *C04B 2111/00586* (2013.01); *C04B 2111/00681* (2013.01); *C04B 2111/00706* (2013.01); *C04B 2111/27* (2013.01); *E04B 1/62* (2013.01)

(58) Field of Classification Search
CPC ................................... C04B 28/14; E04B 1/62
See application file for complete search history.

(56) References Cited

U.S. PATENT DOCUMENTS

| | | | |
|---|---|---|---|
| 3,933,514 A | 1/1976 | Banks et al. | |
| 3,959,541 A * | 5/1976 | King | ........................ B32B 5/245 |
| | | | 442/283 |

(Continued)

FOREIGN PATENT DOCUMENTS

| | | |
|---|---|---|
| CN | 105370001 A | 3/2016 |
| CN | 207003880 U | 2/2018 |

(Continued)

OTHER PUBLICATIONS

International Search Report and Written Opinion from PCT/US21/52500 dated Feb. 28, 2022.

(Continued)

*Primary Examiner* — Humera N. Sheikh
*Assistant Examiner* — Julia L Rummel
(74) *Attorney, Agent, or Firm* — Calfee, Halter & Griswold LLP

(57) ABSTRACT

A cellular glass insulation system for an outer surface of a structure or pipe. The insulation system includes multiple segments of cellular glass. An adhesive having a reduced permeability is provided at the interface between the individual cellular glass segments and is configured to limit water intrusion that might cause corrosion of the structure or pipe.

6 Claims, 10 Drawing Sheets

(56) References Cited

U.S. PATENT DOCUMENTS

| | | | |
|---|---|---|---|
| 4,623,585 | A | 11/1986 | Linton et al. |
| 4,647,496 | A | 3/1987 | Lehnert et al. |
| 5,253,461 | A | 10/1993 | Janoski et al. |
| 6,616,752 | B1 | 9/2003 | Basura et al. |
| 6,824,607 | B2 | 11/2004 | Baeuml et al. |
| 6,913,643 | B2 | 7/2005 | Dejaiffe |
| 6,964,809 | B2 | 11/2005 | Hojaji et al. |
| 7,226,662 | B2 | 6/2007 | Marohn |
| 7,459,208 | B2 | 12/2008 | Wang |
| 7,695,560 | B1 | 4/2010 | Buarque De Macedo |
| 7,976,939 | B2 | 7/2011 | Hojaji et al. |
| 8,197,932 | B2 | 6/2012 | Buarque De Macedo et al. |
| 8,236,415 | B2 | 8/2012 | Hojaji et al. |
| 8,453,401 | B2 | 6/2013 | Buarque De Macedo |
| 8,486,327 | B2 | 7/2013 | Stilkerieg |
| 9,185,748 | B2 | 11/2015 | Zimmerer et al. |
| 9,365,457 | B2 | 6/2016 | Wu |
| 9,376,344 | B2 | 6/2016 | Ramsey |
| 9,506,244 | B2 | 11/2016 | Goletto et al. |
| 9,637,246 | B2 | 5/2017 | Ungerleider |
| 9,725,350 | B2 | 8/2017 | Lehman et al. |
| 10,119,775 | B2 | 11/2018 | Dekoninck et al. |
| 10,160,691 | B2 | 12/2018 | Prat et al. |
| 2001/0031329 | A1* | 10/2001 | Shaffer ............... F16L 59/022 428/36.9 |
| 2006/0075704 | A1 | 4/2006 | Hojaji et al. |
| 2007/0049144 | A1 | 3/2007 | Brzozowski et al. |
| 2008/0148997 | A1 | 6/2008 | Blackburn et al. |
| 2008/0287574 | A1 | 11/2008 | Loth et al. |
| 2009/0301355 | A1 | 12/2009 | Eide |
| 2012/0216722 | A1* | 8/2012 | Stuart .................. C04B 28/14 524/270 |
| 2012/0263963 | A1* | 10/2012 | Mahoney ............ C04B 24/2611 156/39 |
| 2012/0286190 | A1* | 11/2012 | Prat ......................... C04B 28/16 252/62 |
| 2015/0101276 | A1 | 4/2015 | Lohmann |
| 2016/0159683 | A1 | 6/2016 | Ungerleider et al. |
| 2016/0289956 | A1 | 10/2016 | Zhang et al. |
| 2016/0355277 | A1 | 12/2016 | Ungerleider et al. |
| 2017/0009914 | A1 | 1/2017 | Badger |
| 2017/0297739 | A1 | 10/2017 | Valentini et al. |
| 2018/0044526 | A1* | 2/2018 | Ayambem ............... C08L 91/06 |
| 2018/0099902 | A9 | 4/2018 | Ungerleider et al. |
| 2019/0352903 | A1 | 11/2019 | Giles et al. |
| 2020/0087472 | A1 | 3/2020 | Schweiger et al. |
| 2020/0171797 | A1 | 6/2020 | Sovey et al. |
| 2020/0284035 | A1 | 9/2020 | Faynot et al. |

FOREIGN PATENT DOCUMENTS

| | | |
|---|---|---|
| EP | 0044468 B1 | 2/1986 |
| WO | 8604889 A1 | 8/1986 |
| WO | 2007089170 A1 | 8/2007 |
| WO | 2017120611 A1 | 7/2017 |
| WO | 2020086318 A1 | 4/2020 |
| WO | 2021041819 A1 | 3/2021 |

OTHER PUBLICATIONS

Office Action from AU Application No. 2021467197 dated Aug. 13, 2025.
Extended European Search Report from EP Application No. 21959607.9 dated Aug. 5, 2025.
Pittsburgh Corning, "Foamglass Insulation," Dec. 2004, 36 pages.

* cited by examiner

GYPSUM CEMENT WITH REDUCED PERMEABILITY

FIELD

The present invention relates to insulation for structures including roofing and pipes, and more particularly, to systems and methods that avoid problems associated with intrusion of moisture occurring between adjacent segments of insulation.

BACKGROUND

Cellular glass insulation is often fabricated into sections for insulating industrial and commercial structures. Cellular glass (also called foam glass or foamed glass) is a preferred choice for certain insulation applications due to its ability to maintain its shape under strenuous conditions and its closed-cell makeup, making it impermeable to water vapor. While cellular glass performs the necessary purpose of energy conservation or process control, other problems may arise when using cellular glass insulation due to its closed cell nature. For instance, corrosion under insulation (CUI) may occur under cellular glass insulation where moisture has been trapped or otherwise allowed to migrate between the insulation and the surface of the pipe or structure, which are often composed of metal. This includes liquid water that is trapped under the insulation and has not been allowed to evaporate or be removed from the system.

Therefore, a need exists for an insulation system that can provide adequate insulation to structures including pipes and vessels in a variety of challenging environments, yet also prevent corrosion along the interface between the insulation and the substrate (e.g., a metal pipe or roof).

SUMMARY

The general inventive concepts are based, in part, on the discovery that conventional porous adhesives (also called cements) may allow for unwanted moisture infiltration between adjacent segments of pipe insulation, which can lead to corrosion of the underlying substrate. There are inherent problems with the conventional gypsum cement based fabrication adhesive material, for manufacturing cellular glass insulation, due to its undesirable porosity. Thus, there is a need for a waterproof (or otherwise moisture resistant) fabrication adhesive for insulation applications that use cellular glass, including those that are exposed to the elements and/or operate at low temperature (e.g., cryogenic applications).

In certain exemplary embodiments, the general inventive concepts contemplate a cellular glass insulation system. The cellular glass insulation system comprises a plurality of cellular glass insulation segments and a modified gypsum cement. The cellular glass insulation segments comprise side joint sections, and end joint sections. The modified gypsum cement is positioned on a joint section at the interface between adjacent cellular glass insulation segments. In certain embodiments, the modified gypsum cement comprises a solid component and a liquid component. In certain embodiments, the solid component comprises a gypsum cement base and the liquid component comprises a waterproofing element and water. In certain embodiments, the waterproofing element and the water are pre-combined to form the liquid component. In certain embodiments, the solid component and the liquid component are combined in a ratio of about 1:1 to 3:1, including about 2:1 by weight. In certain embodiments, the modified gypsum cement comprises a gypsum cement base, water, and a waterproofing element present in an amount of 5% to 40% by weight of the gypsum cement base.

In certain exemplary embodiments, the general inventive concepts contemplate a method of insulating a pipe. The method comprises mixing a gypsum cement base, water, and a waterproofing element to form a modified gypsum cement, wherein the waterproofing element displaces a portion of the water; providing a plurality of cellular glass insulation segments, each cellular glass insulation segment comprising a length, side joint sections extending the length of the cellular glass insulation segment, and end joint sections; applying the modified gypsum cement to at least one side joint section; and positioning the cellular glass insulation system about the exterior of a pipe.

In certain exemplary embodiments, the general inventive concepts contemplate a method of insulating a structure. The method comprises mixing a gypsum cement base, water, and a waterproofing element to form a modified gypsum cement, wherein the waterproofing element displaces a portion of the water; providing a plurality of cellular glass insulation segments, each cellular glass insulation segment comprising a length, side joint sections extending the length of the cellular glass insulation segment, and end joint sections; applying the modified gypsum cement to at least one side joint section; and positioning the cellular glass insulation system about an exterior of the structure.

Other aspects and features of the general inventive concepts will become more readily apparent to those of ordinary skill in the art upon review of the following description of various exemplary embodiments in conjunction with the accompanying figures.

BRIEF DESCRIPTION OF THE DRAWINGS

The general inventive concepts, as well as embodiments and advantages thereof, are described below in greater detail, by way of example, with reference to the drawings in which.

DETAILED DESCRIPTION

Figure 1:
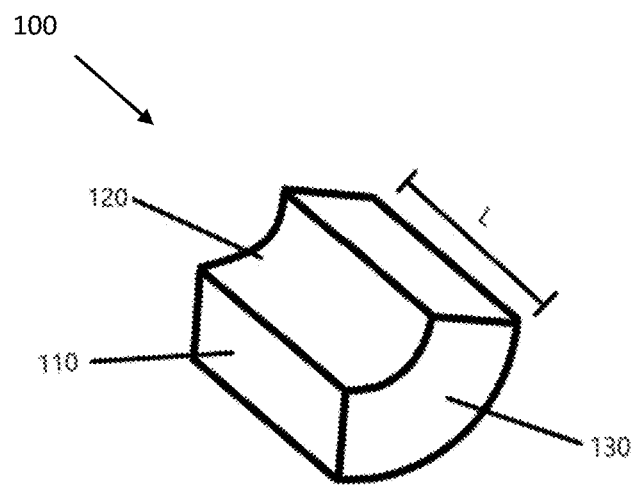
FIG. 1 shows an illustration of a conventional cellular glass insulation segment.

Several illustrative embodiments will be described in detail with the understanding that the present disclosure merely exemplifies the general inventive concepts. Embodiments encompassing the general inventive concepts may take various forms and the general inventive concepts are not intended to be limited to the specific embodiments described herein.

While various exemplary embodiments are described or suggested herein, other exemplary embodiments utilizing a variety of methods and materials similar or equivalent to those described or suggested herein are encompassed by the general inventive concepts.

Unless defined otherwise, all technical and scientific terms used herein have the same meaning as commonly understood by one of ordinary skill in the art to which the invention belongs. In this connection, unless otherwise indicated, concentrations of ingredients given in this document refer to the concentrations of these ingredients in the master batch or concentrate, in keeping with customary practice.

The term "gypsum cement base" as used herein, refers to the dry ingredients of a conventional gypsum cement (e.g., the solid component). For example a commercial product such as Hydrocal B11 sold by U.S. Gypsum.

The term "gypsum cement mixture" as used herein refers to the combination of a solid component and a liquid component (e.g., gypsum cement base and water).

The term "modified gypsum cement" as used herein, refers to a gypsum cement mixture, optional water, and a waterproofing element, according to the general inventive concepts. In certain embodiments, the solid component and the liquid component are combined in a ratio of about 1:1 to 3:1, including about 2:1 by weight.

The term "waterproofing element" as used herein, refers to a chemical composition that reduces the permeability and permeance of a gypsum cement mixture by displacing a portion of the water that would otherwise make up the liquid portion of the gypsum cement mixture.

The term "displacing a portion of the water" as used herein, refers to a modification of the ingredient formula for making a gypsum cement mixture or modified gypsum cement mixture. The modification entails replacing a portion of the water (or otherwise liquid portion) that would conventionally be used to make a gypsum cement mixture with an amount of a waterproofing element. Thus, in certain exemplary embodiments, the total amount of water and waterproofing element is about 50% by weight based on the gypsum cement base. For example, in a typical mixing procedure: a solid component, 100 g gypsum base, is mixed with a liquid component, 50 g of water. Whereas a mixing procedure for a modified gypsum cement comprises 100 g gypsum base+25 g of wax emulsion+25 g of water are mixed to form a modified gypsum cement. In certain exemplary embodiments, the wax emulsion is made up of approximately 50% wax, with the remainder water. In certain exemplary embodiments, the total amount of wax is between 5% and 15% of the modified gypsum cement mixture. In certain exemplary embodiments, the liquid component (i.e., the water and the wax emulsion) are "pre-mixed." Thus, the general inventive concepts contemplate the combination of a solid component (i.e., the gypsum base) and a liquid component (comprising the e.g., wax emulsion (comprising wax and water) and water). In certain embodiments, a mixing procedure for a modified gypsum cement comprises mixing 100 g gypsum base with 50 g of a mixture of water and the wax emulsion (this is similar to the previous example, but the wax and water components are already in one component). Further, in certain exemplary embodiments, a modified gypsum cement comprises 100 g of gypsum cement base (solid component) and 50 g of a liquid component comprising a diluted wax emulsion. In either of these exemplary embodiments, the wax itself makes up about 25% by weight of the liquid component of the adhesive/cement and this is equivalent to approximately 8-9% wax in the total adhesive solids of mix. In these embodiments, the liquid component would comprise from about 10% to about 40% wax, including about 20% to about 30% wax, and including about 25% wax.

The general inventive concepts relate to systems for and methods of insulating a structure (e.g., a roof) or pipe. The intrusion of moisture into the region or space between an insulation system and the underlying substrate (e.g., a pipe or metal roof) can cause significant complications to an industrial facility or a building owner. In particular, the ingress of water can promote corrosion under the insulation as well as degrade the desired insulating properties of the system. Corrosion under insulation (CUI) is a major issue within systems operating at temperatures where water may exist in a liquid state. For example, even high temperature equipment may show CUI when the liquid water cycles onto the equipment surface during shutdowns or system cycling.

In the case of cellular glass, the corrosion is the result of moisture penetrating the spaces between the cellular glass joints. In order to avoid corrosion under insulation and degraded thermal characteristics, an effective insulation system needs to prevent the intrusion of water into the system and also onto the pipe or vessel surface. If water does infiltrate the sealed system (due to damage or other circumstances) the insulation system still needs to be able to contain/isolate the moisture ingress to prevent further damage.

Cellular glass (sometimes called foamed glass or foam glass) is a rigid, non-porous insulation material. One use for cellular glass is insulation of pipes, especially in high temperature work (e.g., above 400° F.) through the entire temperature range to cryogenic temperature environments. Because cellular glass is not flexible, in order to form customized insulation products, cellular glass must be formed or otherwise shaped into fabricated sections (e.g., half sections, quarter sections, or segments) that fit around the exterior of the pipe. The foam glass pipe insulation is typically fabricated using a cement to seal discrete foam glass sections together. Intrusion of moisture into insulation systems can cause a variety of issues such as corrosion of a pipe or other structure. Gypsum cements, made by combining a gypsum cement powder and water, are a conventional cement for adhering foam glass sections to one another. However, the conventional gypsum cement used to fabricate the foam glass insulation is porous, which allows for water intrusion over time.

Due to the porosity of gypsum cement-based adhesive materials, a typical hydrophobic additive is not effective at stopping water vapor permeation through the cellular glass joints. The general inventive concepts are based, in part, on the discovery that certain agents perform much better at blocking/closing the pores of gypsum cement. SEM images clearly show the high porosity of conventional gypsum adhesives in contrast to those that have an additive with mostly blocked pores. Further, water vapor permeability measurement results also show significantly reduced water vapor permeation through the adhesive joints that include the inventive formulations.

While not wishing to be bound by theory, Applicants believe the porosity of the cement is decreased by occlusion of the pores of the unmodified gypsum cement microstructure. In certain exemplary embodiments, the waterproofing element is one of a wax emulsion and a silicon emulsion. In certain exemplary embodiments, the waterproofing element is a chemical composition that reduces gypsum porosity and thus water vapor permeability according to the ASTM E 96 Test Method. In certain exemplary embodiments, the wax emulsion comprises a paraffin wax particulate with an average particle size of 0.5 to 20 microns in diameter.

Therefore, the general inventive concepts contemplate a new cement composition for fabricating cellular glass insulation systems and a method of reducing the permeability of a cellular glass cement adhesive. The new formulation comprises a gypsum cement base combined with water and a waterproofing element that displaces a portion of the water that would otherwise make up the conventional cement mixture. Particular embodiments of the waterproofing element include a silicon emulsion and a wax emulsion. The waterproofing element (e.g., emulsified wax in the liquid portion of the mixture) substantially reduces the porosity and pore size in the gypsum cement after curing (without wishing to be bound by theory, it is Applicant's belief that the emulsified wax particles can effectively fill the pores that would otherwise be present in the cement in a manner that cannot be achieved by application of conventional waterproofing aids to a cement). In addition, Applicant has discovered that a particular particle size range for the wax component of the waterproofing element (the particles suspended in the emulsion) provides surprising performance with respect to reduction of water vapor permeability of the modified gypsum cement. In certain exemplary embodiments, the particle size is less than 20 microns, including an average particle size of about 0.1 microns to about 15 microns, including an average particle size of about 0.1 microns to about 10 microns, including an particle size average of about 0.1 microns to about 9 microns, including an average particle size of about 0.1 microns to about 8 microns, including an average particle size of about 0.1 microns to about 7 microns, including an average particle size of about 0.1 microns to about 6 microns, including an average particle size of about 0.5 microns to about 7 microns, including an average particle size of about 1 micron to about 7 microns, including an average particle size of about 1 microns to about 6 microns, including an average particle size of about 1 micron to about 5 microns, including an average particle size of about 2 micron to about 5 microns.

The method of the general inventive concepts involves replacing a portion of the water used to mix the gypsum cement base with a volume of the waterproofing element (e.g., a wax emulsion). The cement is then applied to the cellular glass in a substantially conventional manner.

While the general inventive concepts are applicable to a variety of insulation systems, the cellular glass for use according to the general inventive concepts is characterized by a low water vapor permeability and generally lower porosity. This in conjunction with the modified gypsum cement's ability to adhere and seal the cellular glass section through temperature cycles that include cryogenic temperatures (e.g., −50° C. to 50° C.) provides an improved cellular glass insulation system which resists CUI.

In certain exemplary embodiments, the waterproofing element is present in the modified gypsum cement in an amount of less than 40% by weight based on the weight of the gypsum cement base. In certain exemplary embodiments, the modified gypsum cement comprises a gypsum cement base, water, and a waterproofing element in an amount of 5% by weight of the gypsum cement base to 40% by weight of the gypsum cement base. In certain exemplary embodiments, the modified gypsum cement comprises a gypsum cement base, water, and a waterproofing element in an amount of 5% by weight of the gypsum cement base to 35% by weight of the gypsum cement base. In certain exemplary embodiments, the modified gypsum cement comprises a gypsum cement base, water, and a waterproofing element in an amount of 5% by weight of the gypsum cement base to 30% by weight of the gypsum cement base. In certain exemplary embodiments, the modified gypsum cement comprises a gypsum cement base, water, and a waterproofing element in an amount of 5% by weight of the gypsum cement base to 25% by weight of the gypsum cement base. In certain exemplary embodiments, the modified gypsum cement comprises a gypsum cement base, water, and a waterproofing element in an amount of 5% by weight of the gypsum cement base to 20% by weight of the gypsum cement base. In certain exemplary embodiments, the modified gypsum cement comprises a gypsum cement base, water, and a waterproofing element in an amount of 5% by weight of the gypsum cement base to 15% by weight of the gypsum cement base. In certain exemplary embodiments, the modified gypsum cement comprises a gypsum cement base, water, and a waterproofing element in an amount of 5% by weight of the gypsum cement base to 10% by weight of the gypsum cement base. In certain exemplary embodiments, the waterproofing element is present in the modified gypsum cement in an amount of about 8% to about 10% by weight of the gypsum cement base.

In certain exemplary embodiments, the amount of water and waterproofing element together is from about 40% to about 60% by weight of the gypsum cement base. In certain exemplary embodiments, the waterproofing element makes up nearly the entire non-gypsum cement base portion (i.e., the liquid portion) of the modified cement, with only a small amount of water needed for formulating the modified gypsum cement.

In certain exemplary embodiments, the waterproofing element is present in the modified gypsum cement in an amount of 2.5% by weight to 20% by weight of the modified gypsum cement. In certain exemplary embodiments, the waterproofing element is present in the modified gypsum cement in an amount of 5% by weight to 20% by weight of the modified gypsum cement. In certain exemplary embodiments, the waterproofing element is present in the modified gypsum cement in an amount of 7% by weight to 20% by weight of the modified gypsum cement. In certain exemplary embodiments, the waterproofing element is present in the modified gypsum cement in an amount of 8% by weight to 15% by weight of the modified gypsum cement. In certain exemplary embodiments, the amount of water and waterproofing element together is from about 8% to about 12% by weight of the modified gypsum cement.

In certain exemplary embodiments, the modified gypsum cement has a water vapor transmission rate of less than 0.02 perm-inch. In certain exemplary embodiments, the modified gypsum cement has a water vapor transmission rate of less than 0.01 perm-inch. In certain exemplary embodiments, the modified gypsum cement has a water vapor transmission rate of less than 0.005 perm-inch. In certain exemplary embodiments, the modified gypsum cement has a water vapor transmission rate of less than 0.002 perm-inch. In certain exemplary embodiments, the modified gypsum cement has a water vapor transmission rate of less than 0.001 perm-inch. In certain exemplary embodiments, the modified gypsum cement has a water vapor transmission rate of 0.02 perm-inch to 0.0001 perm-inch. In certain exemplary embodiments, the modified gypsum cement has a water vapor transmission rate of 0.02 perm-inch to 0.0002 perm-inch. In certain exemplary embodiments, the modified gypsum cement has a water vapor transmission rate of 0.02 perm-inch to 0.0005 perm-inch.

As mentioned, the general inventive concepts contemplate a method of insulating a pipe. In certain exemplary embodiments, the method comprises mixing a gypsum cement base, water, and a waterproofing element to form a modified gypsum cement, wherein the waterproofing element displaces a portion of the water; providing a plurality of cellular glass insulation segments, each cellular glass insulation segment comprising a length, side joint sections extending the length of the cellular glass insulation segment, and end joint sections; applying the modified gypsum cement to at least one side joint section; and positioning the cellular glass insulation system about the exterior of a pipe.

FIG. 1 shows an exemplary ¼ segment of cellular glass pipe insulation 100. While the segment is illustrated herein as a quarter segment, those of ordinary skill will understand that a variety of segment combinations are contemplated and would be suitable for the general inventive concepts. Accordingly, it is not intended that the general inventive concepts be limited to those specific embodiments described herein. The cellular glass pipe insulation is defined by a length L, side joint sections 110, an inner pipe bore 120, and end joint sections 130. The inner pipe bore 120 defines the area in which the pipe will by positioned between the cellular glass pipe insulation segments and is adapted for fitting around an arc of the exterior of the pipe. The end joint sections 130 are substantially flat and extend the length of the cellular glass pipe insulation segment 100 between the inner pipe bore 120 and the exterior of the cellular glass pipe insulation segment 100. During installation, the individual insulation segments are fitted about the pipe and a sealant/adhesive (such as a gypsum cement) is applied along the side joint sections.

Figure 2:
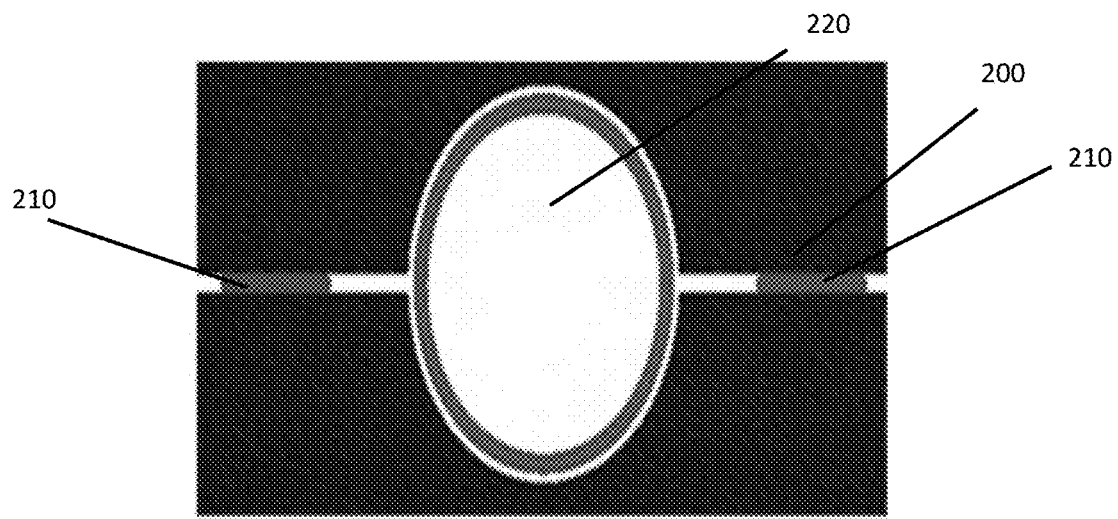
FIG. 2 shows an example of a conventional cellular glass insulation positioned around a pipe.

FIG. 2 shows a conventional cellular glass pipe insulation system. In this embodiment, pipe 300 is substantially surrounded by two segments of cellular glass insulation 200. The interface where the cellular glass segments 200 meet is joined with a cement/adhesive 400. The cement 400 is conventionally a gypsum-based cement. Because the purpose of the adhesive is to close off the joint between adjacent foam glass segments 200, the adhesive 400 is generally applied to the joint sections, which are then mated together around the pipe. The purpose of the adhesive is to join the individual segments of foam glass together and to form a barrier to prevent water intrusion at the joints.

In a similar fashion, blocks of cellular glass insulation may be assembled on a roof or other structure to provide insulation including both thermal insulation and protection from moisture. Conventional cellular glass roof insulation is made up of blocks of cellular glass and a bitumen-based adhesive. The cellular glass blocks are assembled on the roof, often with a layer of adhesive applied to the top/exterior surface of the cellular glass, at an interface or joint between adjacent segments of cellular glass, and/or between the cellular glass and the surface of the roof. The smooth surface of metal-clad roofing can complicate installation without an effective adhesive between the cellular glass segments and the roof. Bitumen adhesives, while displaying many beneficial temperature-related properties, have known drawbacks regarding human health and safety regulations and installation. Thus, an adhesive for replacing bitumen must demonstrate good thermal characteristics, good adhesion to metal surfaces, while avoiding the drawbacks of bitumen adhesives.

In certain exemplary embodiments, the general inventive concepts contemplate a cellular glass insulation system. The cellular glass insulation system comprises a plurality of cellular glass insulation segments and a modified gypsum cement. The cellular glass insulation segments comprising a length, side joint sections, and end joint sections. The modified gypsum cement is positioned on a joint section at the interface between adjacent cellular glass insulation segments. In certain embodiments, a layer or coating of the modified gypsum cement is applied to the surface of the roof. In certain embodiments, a layer or coating of the modified gypsum cement is applied to an exposed surface of the insulation system. The modified gypsum cement comprises a gypsum cement base, water, and a waterproofing element as discussed herein.

Figure 3:
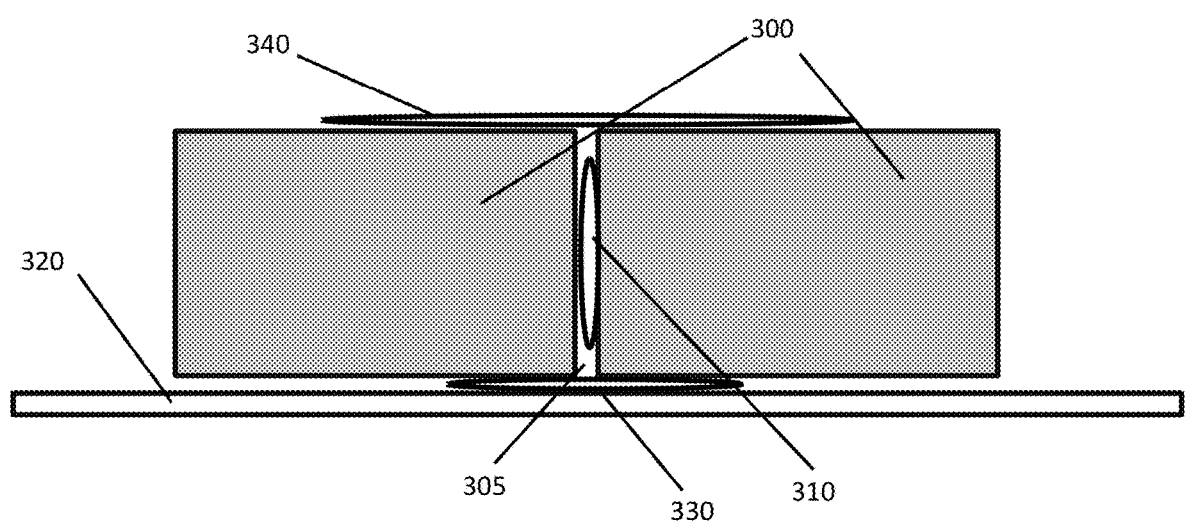
FIG. 3 shows an illustration of a cellular glass roof insulation system including a modified gypsum cement adhesive.

FIG. 3 shows an embodiment of a cellular glass insulation system installed on a roof or other building structure 320. In this embodiment, two segments of cellular glass insulation 300 are positioned on the structure. The interface 305 where the cellular glass segments 300 meet is joined with a cement/adhesive 310 according to the general inventive concepts. In certain embodiments, the cement/adhesive 310 is a modified gypsum cement. Because one function of the adhesive is to close off each joint between adjacent cellular glass segments 300, the adhesive 310 is generally applied to the joint sections (i.e., the sides of the cellular glass block that will be mated together), which are then brought together on the surface of the structure 320 to form the cellular glass insulation system. In certain embodiments, the modified gypsum cement may be applied to the interface 330 between the cellular glass segments 300 and the structure 320 (e.g., an interior surface of the cellular glass segment). In certain embodiments, the modified gypsum cement may be applied as a coating layer 340 to an exterior surface of the cellular glass segments 300. In certain embodiments, the roof surface is comprised of metal.

Examples

The following Examples are provided to better demonstrate specific embodiments of the general inventive concepts. They should not be construed to limit the inventive concepts described herein, which are defined by the claims.

Figure 4:
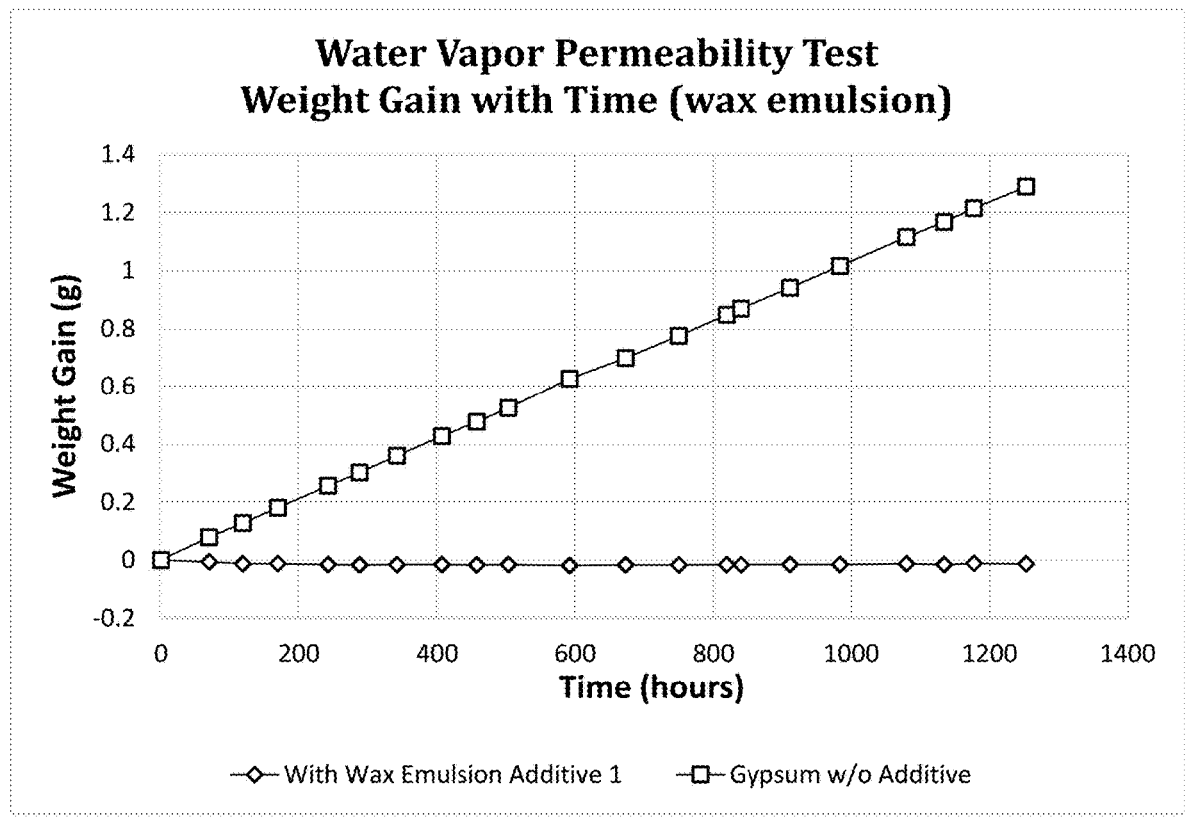
FIG. 4 shows a plot of weight change over time for a control gypsum cement adhesive (Hydrocal B11) compared to a modified cement made with a wax emulsion waterproofing element according to the general inventive concepts.

Example 1: water vapor permeability test. A series of gypsum-based cements were prepared and tested according to ASTM E96, "Standard Test Methods for Water Vapor Transmission of Materials." In a typical formulation, 100 grams gypsum powder are mixed with 10 g waterproofing element and 30 grams water. The combination is mixed well and spread an even layer onto one cellular glass surface and then a second cellular glass surface is mated to the first. The two pieces are gently moved to make sure the cement spreads evenly; let it sit over night before cutting into shape for testing. FIG. 4 shows the results of a conventional gypsum cement compared to a modified cement including a wax emulsion. As can be seen from the graph, inclusion of the wax emulsion significantly reduces the water vapor transmission relative to the conventional gypsum cement adhesive, Hydrocal B11. The sample uses a wax emulsion as the waterproofing element, has achieved a Water Vapor Transmission rate of <0.002 perm-inch, which is required per "ASTM Standard for Fabrication of Cellular Glass Pipe and Tubing Insulation (ASTM C1639)."

Figure 5:
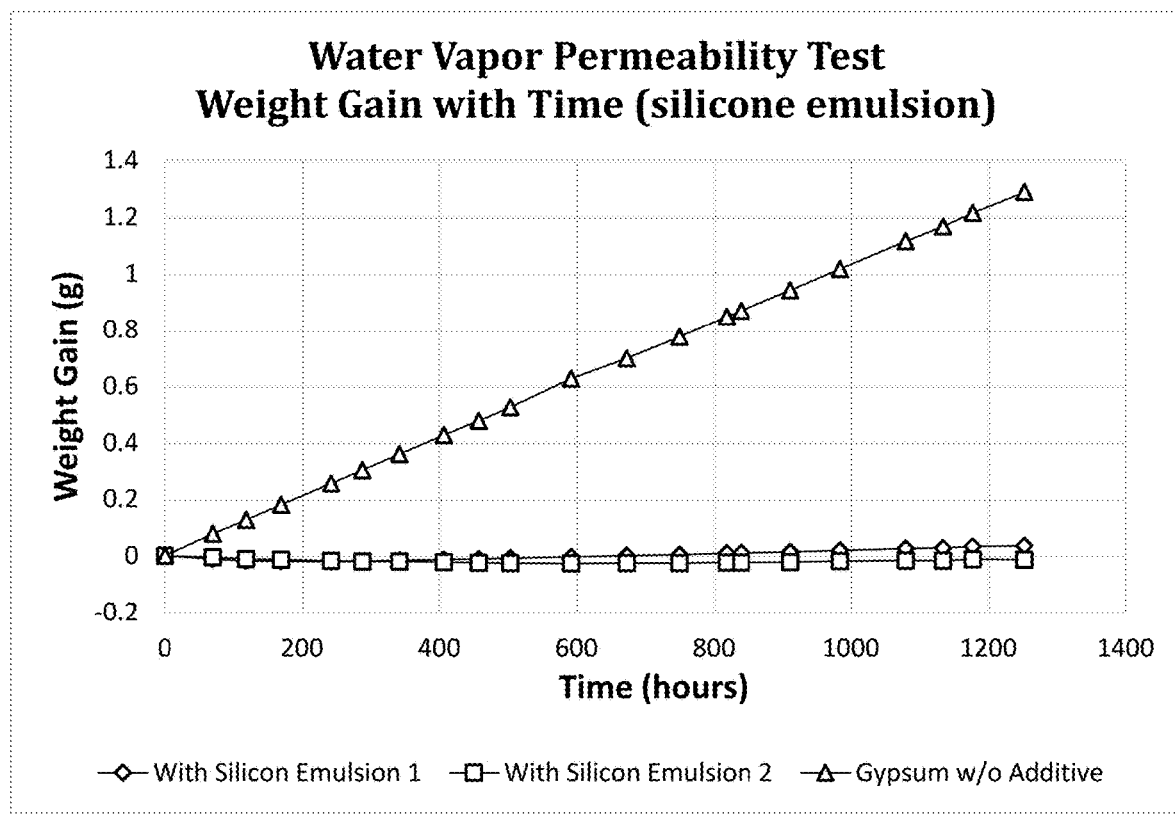
FIG. 5 shows a plot of weight change over time for a control cement compared to two cements made with silicon emulsion waterproofing element.

Example 2: water vapor permeability test. Similar to Example 1, FIG. 5 shows the results of a series of gypsum-based cements tested according to ASTM E96. More specifically, FIG. 5 shows the results of a conventional gypsum cement compared to a modified cement including C9 silicone emulsion and C20 silicone emulsion. As can be seen from the graph, inclusion of the silicone emulsion significantly reduces the water vapor transmission relative to the conventional gypsum cement adhesive, Hydrocal B11.

Figure 6:
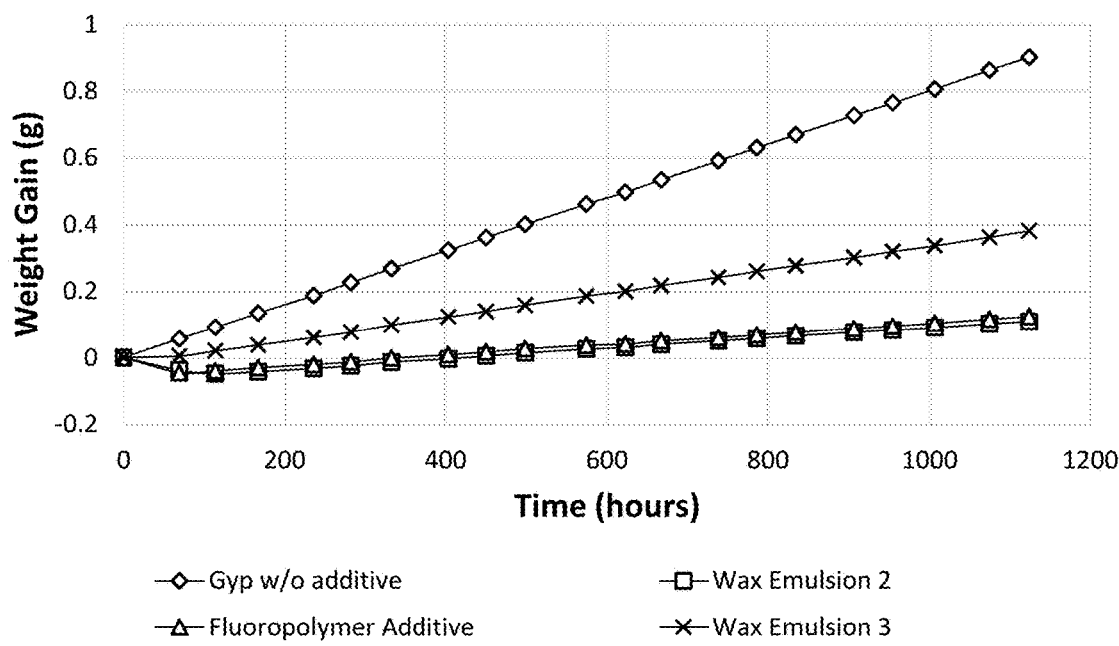
FIG. 6 shows a plot of weight change over time for a control cement compared to a series of cements made with a series of waterproofing elements.

Example 3: water vapor permeability test. Similar to Example 1, FIG. 6 shows the results of a series of gypsum-based cements tested according to ASTM E96. FIG. 6 shows the results of a conventional gypsum cement compared to three separate waterproofing elements. The purple data is for Aqualite 070, Green is for Nuva N2155, and Red is for Michem 67235. As can be seen from the graph, inclusion of the wax emulsion significantly reduces the water vapor transmission relative to the conventional gypsum cement adhesive, Hydrocal B11.

Figure 7:
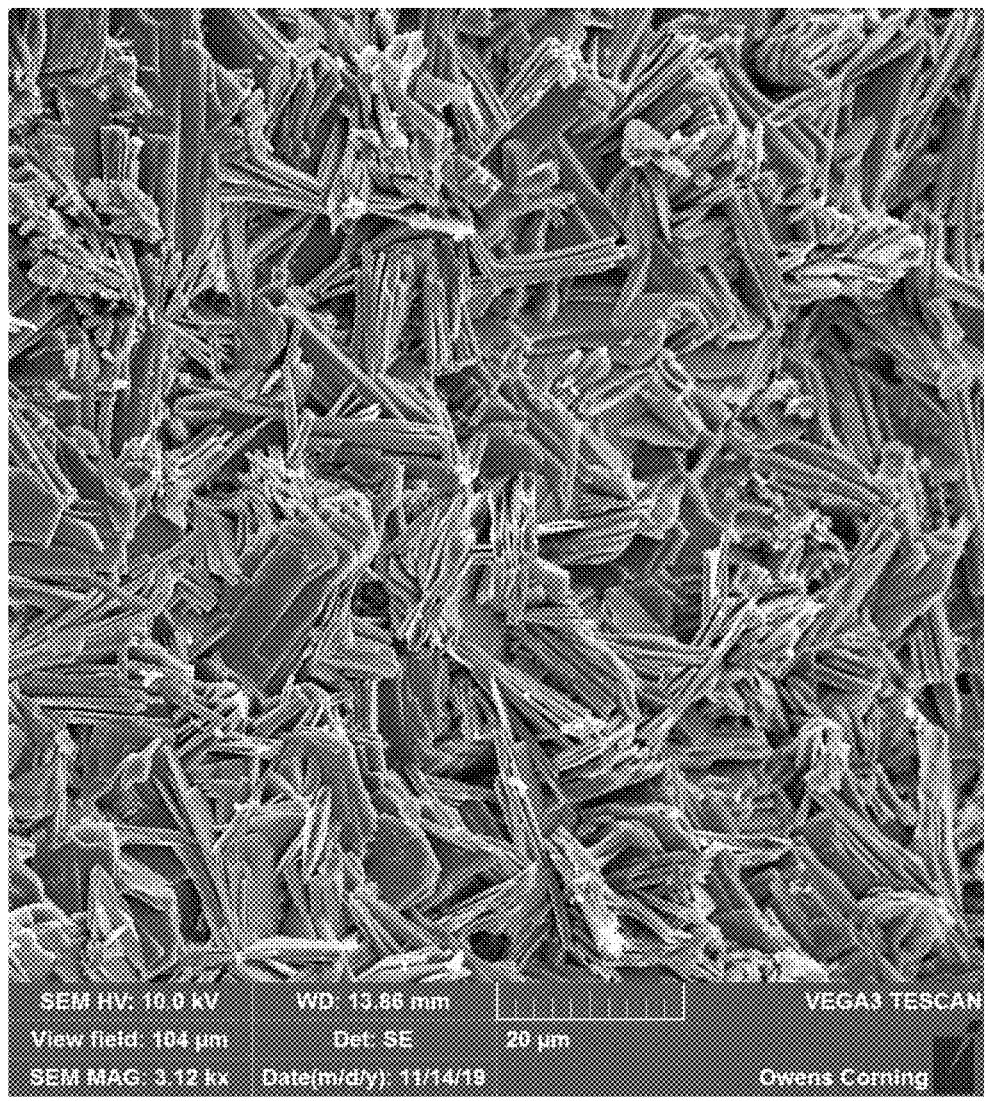
FIG. 7 shows an SEM image of the control gypsum cement without a waterproofing element. The image shows the typical open porosity of the cement which leads to a high moisture permeability.
Figure 8:
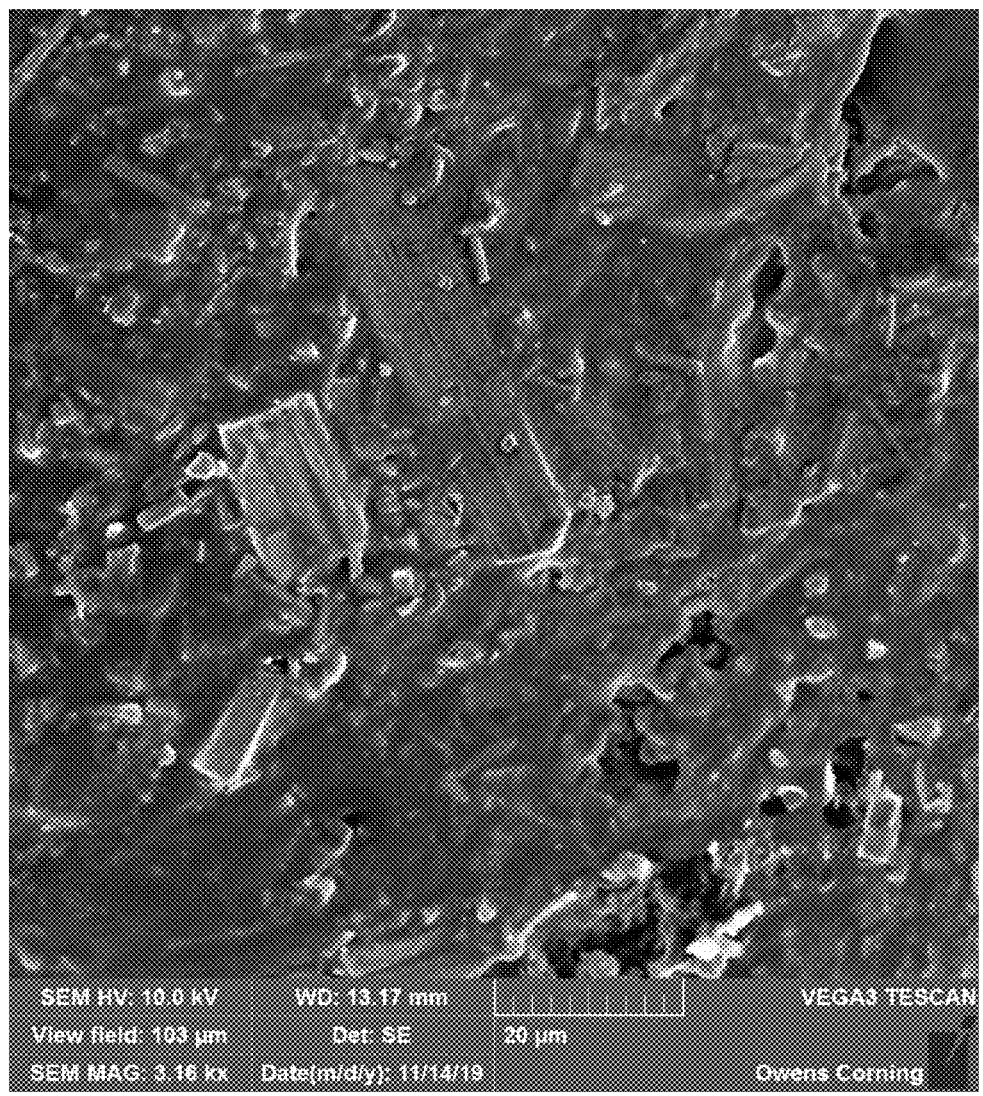
FIG. 8 is an SEM image of the control cement formulated with a wax emulsion (i.e., a modified gypsum cement) showing the closed pore structure with a paraffin wax particle addition.

Example 4: SEM images show pore size reduction. Two formulations of gypsum cement were prepared, a conventional cement made up of Hydrocal B11 (FIG. 7, control) and a modified gypsum cement including B11 with a wax emulsion (e.g., a 50% mixture of water and wax) and water (FIG. 8). The modified gypsum cement comprised 30 g gypsum, 12 g wax emulsion, and 3 g water. The images show a difference in porosity with the latter showing obvious pore reduction/blockage relative to the conventional cement, due to incorporation of the wax emulsion.

Figure 9:
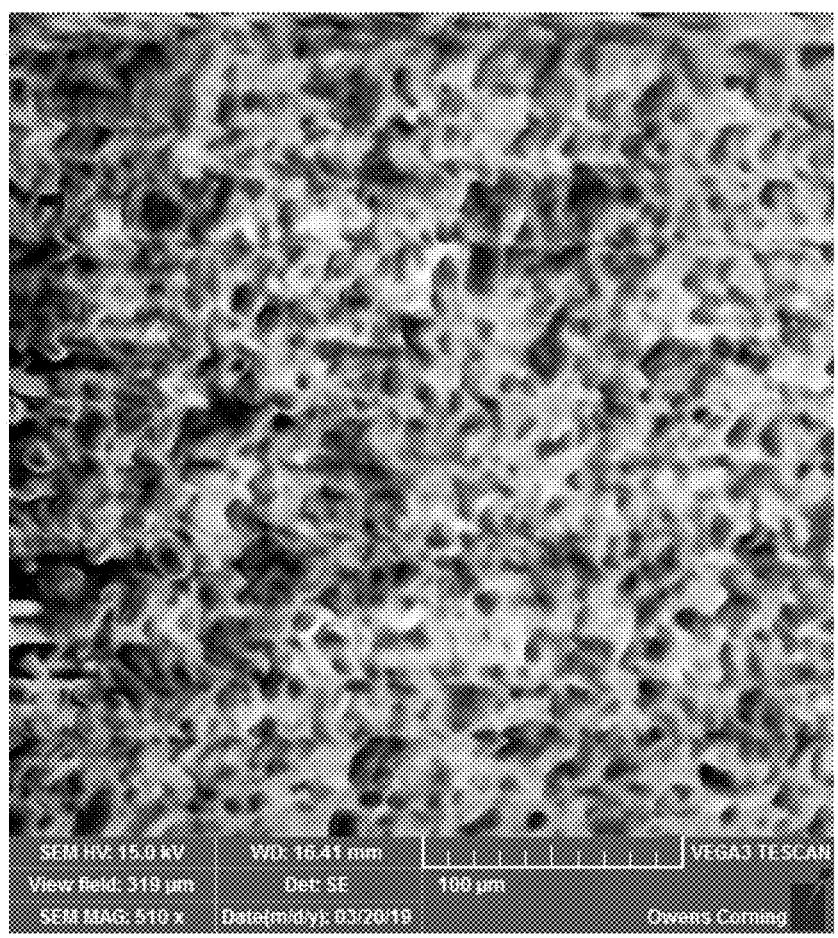
FIG. 9 is an SEM image of the control gypsum cement without a waterproofing element.
Figure 10:
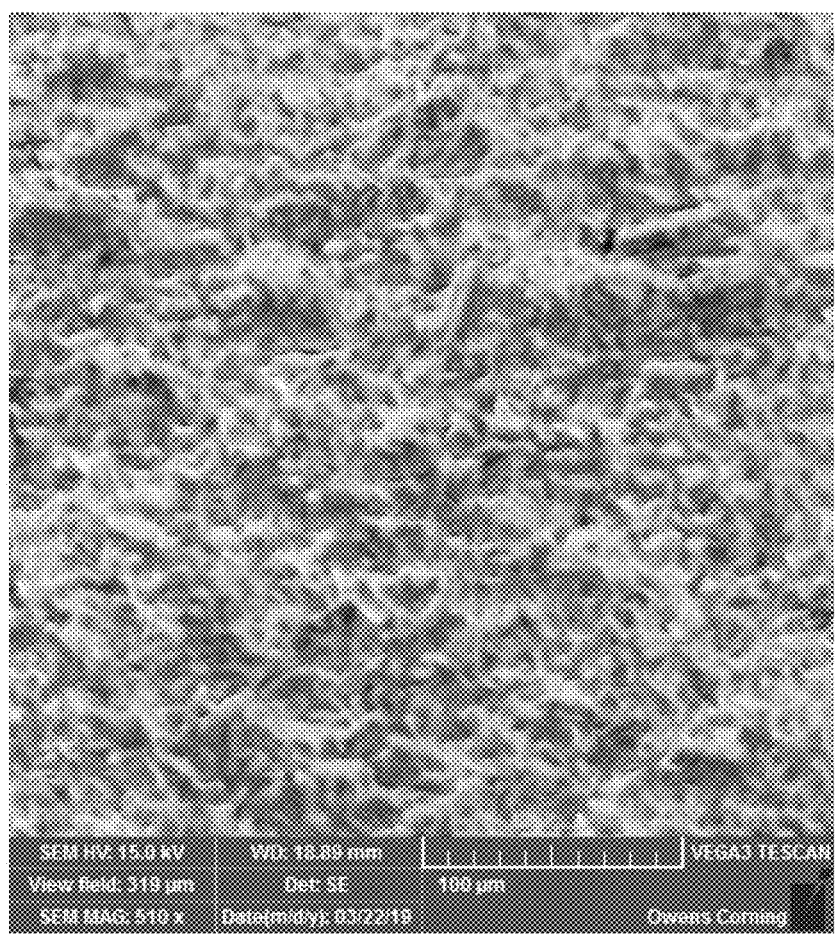
FIG. 10 is an SEM image of gypsum cement with a silicon emulsion waterproofing element (i.e., a modified gypsum cement).
Figure 11A:
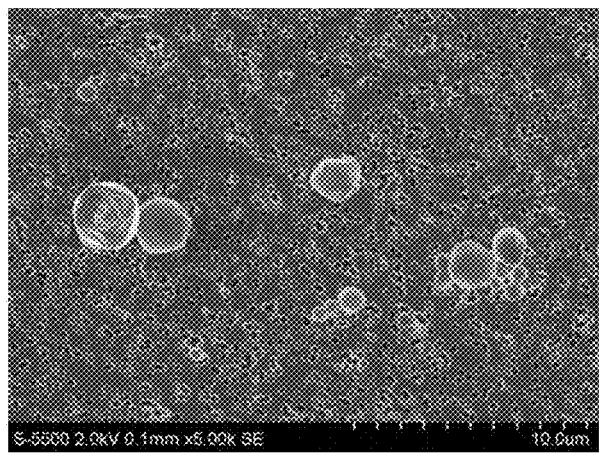
FIG. 11A is an SEM image showing paraffin wax emulsion size and shape with an average particle size of between 0.5 to 20 microns in diameter.
Figure 11B:
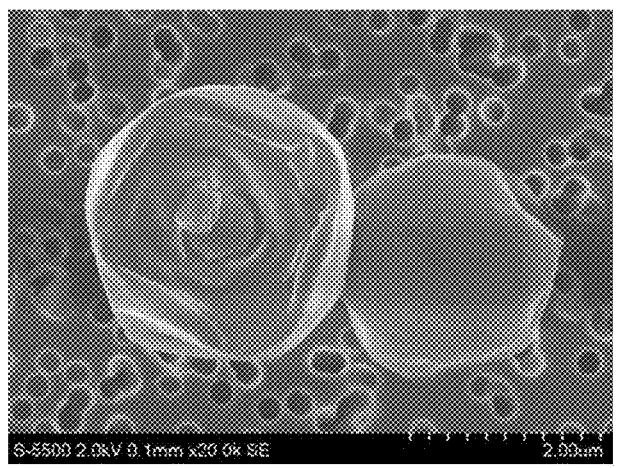
FIG. 11B is a magnified view of the paraffin wax shown in FIG. 11A, showing paraffin wax particles with an average particle size of between 1 to 5 microns in diameter.

Example 4 cont'd: SEM images show pore size reduction. Two formulations gypsum cement were prepared: a conventional cement made up of Hydrocal B11 (FIG. 9, control) and a modified gypsum cement including B 11 with a silicon emulsion (FIG. 10). The images show a difference in porosity with FIG. 10 showing obvious pore reduction/blockage relative to the conventional cement, due to incorporation of the wax emulsion.

Example 5: Temperature Cycle Testing of Roof Sections. In this test a modified gypsum cement was applied to the interfaces between cellular glass sections; a cellular glass section and concrete; and cellular glass and metal. A top coating was also applied to the surface of the cellular glass segment. The samples were then subjected to thermal cycle testing as follows:

$1^{st}$: −10/+30° C. 2 hours each hold, 8 cycles
$2^{nd}$: −15/+40° C. 2 hours each hold, 8 cycles
$3^{rd}$: −20/+50° C. 2 hours each hold, 12 cycles
$4^{th}$: −25/+60° C. 2 hours each hold, 6 cycles
$5^{th}$: −30/+70° C. 2 hours each hold, 10 cycles The modified gypsum cement (i.e., comprising up to 20% paraffinic wax emulsion) according to the general inventive concepts passed the thermal cycling tests.

Example 6: Corrosion testing. Conventional gypsum cement and a modified gypsum cement according to the general inventive concepts were tested for whether they contributed to corrosion on a metal surface (a proxy for a metal roof). Conventional gypsum cement failed the corrosion test, whereas the metal surface with the modified gypsum cement did not show signs of corrosion.

Example 7: A series of modified gypsum cement adhesives were made using waterproofing elements to displace a portion of the water that would otherwise be used to make the gypsum cement. The modified gypsum cements were tested for water vapor permeability. A conventional cement made from Hydrocal B11 gypsum cement was also tested as a control. Table 1 shows the results of the permeability test.

TABLE 1

| Sample | % Waterproofing Element | Perm Inch (Bulk) |
|---|---|---|
| Hydrocal B11 (control) | 0 | 6.49 |
| Silicon emulsion (50:50 silicon:water emulsion) | 10 | 3.51 |
| Silicon emulsion (50:50 silicon:water emulsion) | 15 | 2.18 |
| Silicon emulsion (50:50 silicon:water emulsion) | 20 | 1.04 |
| Silicon emulsion (50:50 silicon:water emulsion) | 20 | 0.99 |
| Silicon emulsion (50:50 silicon:water emulsion) + Nuva (fluoropolymer) | 20 + 15 | 0.44 |

Example 8: Modified gypsum cement mixtures were made without water and their water vapor permeability was measured. A conventional cement made from Hydrocal B11 gypsum cement and water was also tested as a control. Table 2 shows the results of the permeability test.

TABLE 2

| Cement Mixture | Amount of waterproofing element | Perm Inch (Bulk) |
|---|---|---|
| Hydrocal B11 (control) | 0 | 8.03 |
| 300 g Hydrocal B11 + 50:50 wax emulsion | 200 g (no water) | −0.014 |
| 300 g Hydrocal B11 + 50:50 wax emulsion | 135 g (no water) | 0.181 |

Example 9: A series of modified gypsum cement adhesives were made using waterproofing elements in an amount of 20% by weight based on the gypsum cement base (e.g., the solid portion). The modified gypsum cements were tested for water vapor permeability. A conventional cement made from Hydrocal B11 gypsum cement was also tested as a control. Table 3 shows the results of the permeability test.

TABLE 3

| Cement Additive | Perm Inch (Joint) |
|---|---|
| Hydrocal B11 (none, control) | 0.168 |
| Silicon emulsion (50:50 silicon:water emulsion) 20% | 0.017 |
| 77030 (anionic wax emulsion) 20% | 0.097 |
| 4983 (ethylene acrylic acid dispersion) 20% | 0.111 |
| 67235 (non-ionic polyethylene emulsion) 20% | 0.032 |

TABLE 3-continued

| Cement Additive | Perm Inch (Joint) |
|---|---|
| Hydrocer 135 (aqueous amide wax dispersion) 20% | 0.052 |
| Wax emulsion (40:60 wax:water emulsion) 20% | 0.063 |
| Nuva 20% | 0.035 |
| Wax emulsion (50:50 wax:water emulsion) 20% | −0.002 |

Example 10: A 50:50 wax emulsion and 50:50 silicon emulsion waterproofing elements were used to make a series of modified gypsum cement adhesives in weight % of 10 to 40% by weight of the gypsum cement base. The modified gypsum cements were tested for water vapor permeability. A conventional cement made from Hydrocal B11 gypsum cement was also tested as a control. Table 4 shows the results of the permeability test.

TABLE 4

| Cement Additive | % Waterproofing Element | Perm Inch (Joint) |
|---|---|---|
| Hydrocal B11 (control) | 0 | 0.176 |
| Silicon emulsion | 20 | 0.014 |
| Silicon emulsion | 30 | 0 |
| Silicon emulsion | 40 | 0 |
| Wax emulsion | 10 | 0 |
| Wax emulsion | 15 | 0 |
| Wax emulsion | 20 | −0.002 |
| Wax emulsion | 30 | −0.003 |
| Wax emulsion | 40 | 0.001 |

Example 11: A series of samples of modified gypsum cement were fabricated according to the general inventive concepts. The samples were tested for requirement of MTh-DTL-24244D, ASTM C795 and NRC Req. Guide 136. Further modified gypsum cement samples were compared to a control group comprising conventional gypsum cement made according to manufacturers' specifications in a 28-day corrosion test. The conventional gypsum cement failed the corrosion testing, whereas the inventive modified gypsum cement made with a wax waterproofing element (in an amount of 8-9% by weight of the modified gypsum cement) passed the corrosion testing as well as MIL-DTL-24244D (SH), ASTM C795 and NRC Req. Guide 136.

Example 12: A series of samples were fabricated and subjected to ignition testing in the presence of liquid oxygen. The modified gypsum cement according to the general inventive concepts passed ASTM G86-17 Standard Test Method for Determining Ignition Sensitivity of Materials to Mechanical Impact in Ambient Liquid Oxygen and Pressurized Liquid and Gaseous Oxygen Environments (LOXMIS per ASTM G86). A series of samples of FOAMGLAS insulation fabricated with a modified gypsum cement according to the general inventive concepts also passed ASTM G86-17 Standard Test Method for Determining Ignition Sensitivity of Materials to Mechanical Impact in Ambient Liquid Oxygen and Pressurized Liquid and Gaseous Oxygen Environments (LOXMIS per ASTM G86).

Based on the corrosion testing, oxygen reactivity testing, and porosity testing, the service temperature range for the modified gypsum cements according to the general inventive concepts encompasses temperatures from below about −200° C. to above about 400° C.

While not wishing to be bound by theory, it is believed that the decrease in the porosity of the adhesive provides more effective sealing (and water impermeability) to the insulation system, while not sacrificing the insulative properties of the system overall. Further, the modified gypsum cement does not sacrifice the adhesive or temperature performance properties of conventional gypsum cement (i.e., cement without the waterproofing element).

All references to singular characteristics or limitations of the present disclosure shall include the corresponding plural characteristic or limitation, and vice versa, unless otherwise specified or clearly implied to the contrary by the context in which the reference is made.

All combinations of method or process steps as used herein can be performed in any order, unless otherwise specified or clearly implied to the contrary by the context in which the referenced combination is made.

All ranges and parameters, including but not limited to percentages, parts, and ratios, disclosed herein are understood to encompass any and all sub-ranges assumed and subsumed therein, and every number between the endpoints. For example, a stated range of "1 to 10" should be considered to include any and all subranges between (and inclusive of) the minimum value of 1 and the maximum value of 10; that is, all subranges beginning with a minimum value of 1 or more (e.g., 1 to 6.1), and ending with a maximum value of 10 or less (e.g., 2.3 to 9.4, 3 to 8, 4 to 7), and finally to each number 1, 2, 3, 4, 5, 6, 7, 8, 9, and 10 contained within the range.

The cellular glass compositions, and corresponding methods of the present disclosure can comprise, consist of, or consist essentially of the essential elements and limitations of the disclosure as described herein, as well as any additional or optional ingredients, components, or limitations described herein or otherwise useful in foam glass composition applications.

The cellular glass compositions of the present disclosure may also be substantially free of any optional or selected ingredient or feature described herein, provided that the remaining composition still contains all of the required elements or features as described herein. In this context, and unless otherwise specified, the term "substantially free" means that the selected composition contains less than a functional amount of the optional ingredient, typically less than 0.1% by weight, and also including zero percent by weight of such optional or selected essential ingredient.

To the extent that the terms "include," "includes," or "including" are used in the specification or the claims, they are intended to be inclusive in a manner similar to the term "comprising" as that term is interpreted when employed as a transitional word in a claim. Furthermore, to the extent that the term "or" is employed (e.g., A or B), it is intended to mean "A or B or both A and B." When the Applicant intends to indicate "only A or B but not both," then the term "only A or B but not both" will be employed. Thus, use of the term "or" herein is the inclusive, and not the exclusive use. In the present disclosure, the words "a" or "an" are to be taken to include both the singular and the plural. Conversely, any reference to plural items shall, where appropriate, include the singular.

In some embodiments, it may be possible to utilize the various inventive concepts in combination with one another. Additionally, any particular element recited as relating to a particularly disclosed embodiment should be interpreted as available for use with all disclosed embodiments, unless incorporation of the particular element would be contradictory to the express terms of the embodiment. Additional advantages and modifications will be readily apparent to those skilled in the art. Therefore, the disclosure, in its broader aspects, is not limited to the specific details presented therein, the representative apparatus, or the illustrative examples shown and described. Accordingly, departures may be made from such details without departing from the spirit or scope of the general inventive concepts.

While the invention has been illustrated and described in detail in the drawings and foregoing description, the same is to be considered as illustrative and not restrictive in character. It should be understood that only the exemplary embodiments have been shown and described and that all changes and modifications that come within the spirit of the invention are desired to be protected.

The invention claimed is:

1. A cellular glass insulation system comprising
a plurality of cellular glass insulation segments, wherein each cellular glass insulation segment comprises a length, two side joint sections extending the length of the cellular glass insulation segment, and two end joint sections;
and a modified gypsum cement applied to at least one joint section between adjacent cellular glass insulation segments;
wherein the modified gypsum cement is formed from a solid component comprising a gypsum cement base and a liquid component comprising water and a waterproofing element;
wherein the modified gypsum cement comprises the solid component and the liquid component in a weight ratio of about 1:1 to 3:1;
wherein the waterproofing element is a wax emulsion and is present in an amount of 5% to 40% by weight of the gypsum cement base; and
wherein the modified gypsum cement has a water vapor transmission rate of less than 0.002 perm-inch.

2. The cellular glass insulation system of claim 1, wherein the waterproofing element is present in an amount of 5% by weight to about 30% by weight of the gypsum cement base.

3. The cellular glass insulation system of claim 2, wherein the waterproofing element is a wax emulsion having an average particle size of about 0.1 to about 10 microns.

4. The cellular glass insulation system of claim 3, wherein the wax emulsion has an average particle size of about 2 to about 6 microns.

5. The cellular glass insulation system of claim 1, wherein the plurality of cellular glass insulation segments are sized and shaped for installation around a pipe.

6. The cellular glass insulation system of claim 1, wherein the cellular glass insulation segments are sized and shaped for installation on a roof of a building.

* * * * *